United States Patent [19]
Spitz

[11] Patent Number: 5,245,676
[45] Date of Patent: Sep. 14, 1993

[54] DETERMINATION OF IMAGE SKEW ANGLE FROM DATA INCLUDING DATA IN COMPRESSED FORM

[75] Inventor: A. Lawrence Spitz, Palo Alto, Calif.

[73] Assignee: Xerox Corporation, Stamford, Conn.

[21] Appl. No.: 454,339

[22] Filed: Dec. 21, 1989

[51] Int. Cl.$^5$ .............................................. G06K 9/36
[52] U.S. Cl. ........................................ 382/46; 382/45; 382/56
[58] Field of Search ................. 382/46, 45, 41, 56; 358/452, 406, 468, 261.3, 261.2

[56] References Cited

U.S. PATENT DOCUMENTS

| | | | |
|---|---|---|---|
| 3,831,146 | 8/1974 | Rundle . | |
| 4,251,799 | 3/1979 | Jih | 340/146 |
| 4,338,588 | 7/1982 | Chevillat et al. . | |
| 4,533,959 | 8/1985 | Sakurai | 382/46 |
| 4,558,461 | 12/1985 | Schlang | 382/9 |
| 4,723,297 | 2/1988 | Postl | 382/46 |
| 4,748,676 | 5/1988 | Miyagawa et al. | 382/46 |
| 4,866,784 | 9/1989 | Barski | 382/46 |
| 4,876,730 | 10/1989 | Britt | 382/37 |
| 4,912,559 | 3/1990 | Ariyoshi et al. | 382/46 |
| 4,953,230 | 8/1990 | Kurose | 382/46 |
| 5,001,766 | 3/1991 | Baird | 382/46 |
| 5,187,753 | 2/1993 | Bloomberg et al. | 382/46 |

FOREIGN PATENT DOCUMENTS

| | | |
|---|---|---|
| 0287027 | 10/1988 | European Pat. Off. . |
| 0308673 | 3/1989 | European Pat. Off. . |
| 434415A3 | 6/1991 | European Pat. Off. . |

OTHER PUBLICATIONS

Baird, Henry S., The Skew Angle of Printed Documents, Proceedings of the SPSE Symposium on Hybrid Imaging Systems, pp. 21–24, 1987.

Postl, W., Detection of Linear Oblique Structures and Skew Scan in Digitized Documents, Proceedings of the Eighth International Conference on Pattern Recognition, pp. 687–689, Oct. 1986 (ISBN 0-8186-0742-4).

Hunter, Roy and A. Harry Robinson, International Facsimile Coding Standards, Proceedings of the IEEE, vol. 68, No. 7, pp. 854–867 (original), Jul. 1980.

Primary Examiner—Joseph Mancuso
Assistant Examiner—Yon J. Couso

[57] ABSTRACT

Skew angle of an image is determined based on determination of location of fiducial points on the image. Fiducial points may be located through a comparison of the scanning of a first line with scanning of a subsequent line. These fiducial points may be defined in terms of pixel color transitions located on a first scan line without a corresponding transition on the succeeding scan line. Skew angle may be determined from image data in uncompressed form or in compressed form. Where skew angle is determined from image data in compressed form, the 2-dimensional CCITT facsimile recommendations may be used. In such cases, the locations of the fiducial points may be taken as the locations of the pass codes of the compressed image data. Specifically, pass codes indicating a pass of white pixels are used.

19 Claims, 8 Drawing Sheets

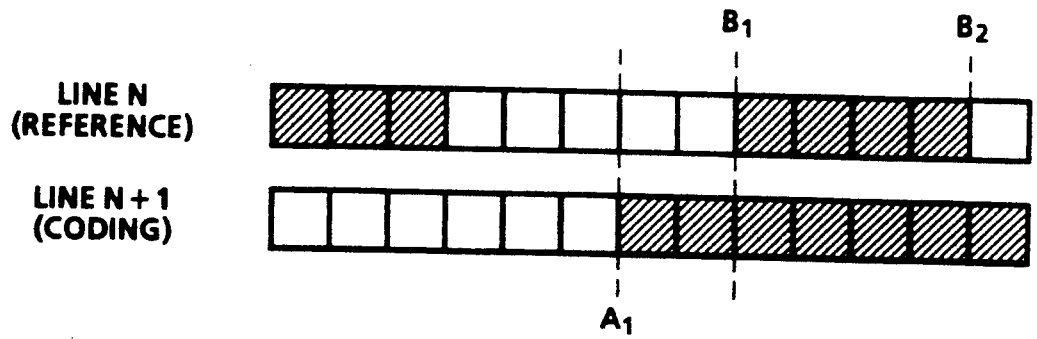
FIG. 3A    VERTICAL MODE: $A_1B_1 \leq 3$
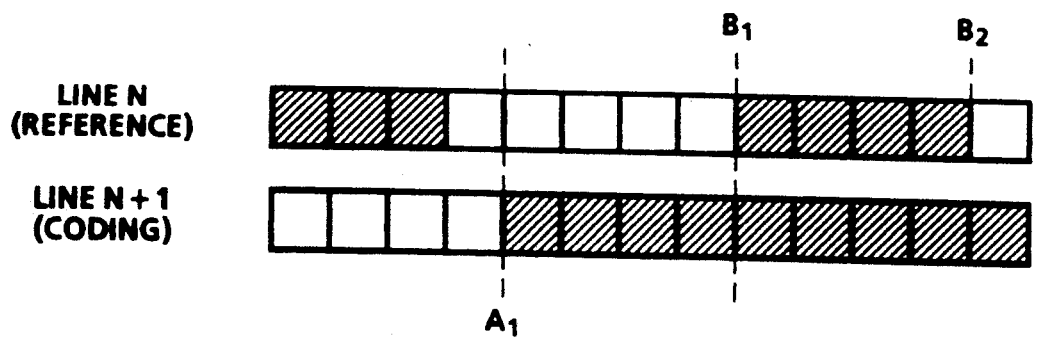
FIG. 3B    HORIZONTAL MODE: $A_1B_1 > 3$
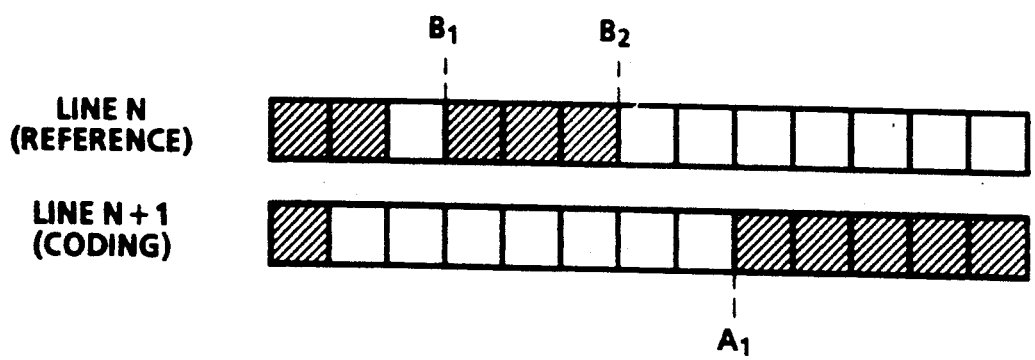
FIG. 3C    PASS MODE: $A_1$ TO THE RIGHT OF $B_2$

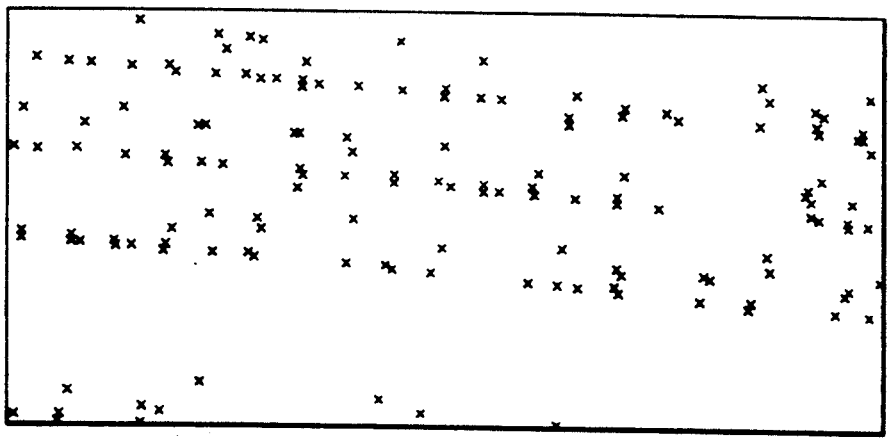
FIG. 8
FIG. 9
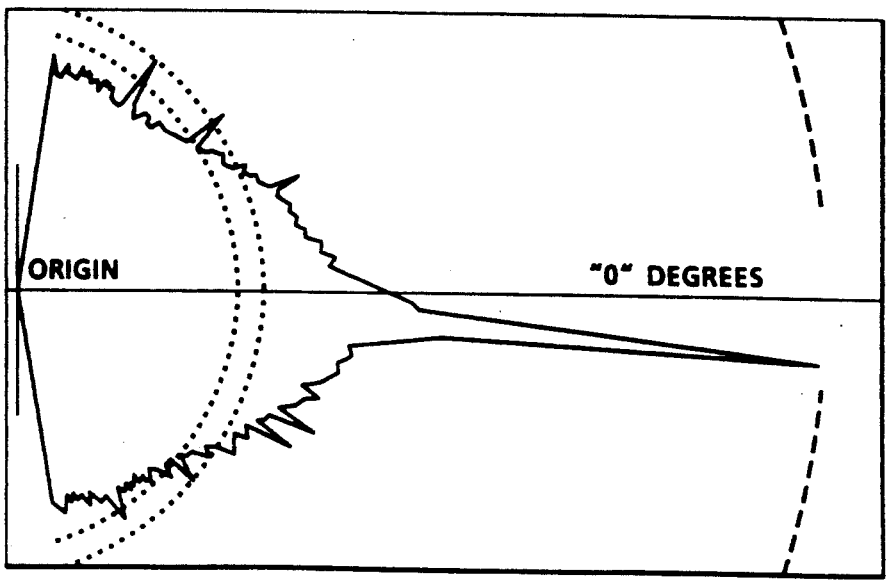
FIG. 10

DETERMINATION OF IMAGE SKEW ANGLE FROM DATA INCLUDING DATA IN COMPRESSED FORM

BACKGROUND OF THE INVENTION

The present invention relates generally to a method for detecting skew present in a scanned image and more specifically to a method of detecting skew of an image which is based on a count of certain features of the image and in which said image may be represented in compressed form.

The human eye can detect very small deviations from orthogonality, particularly in digital images of simple structures where the discontinuities caused by aliasing errors draw attention to these deviations. There is less information available about the human sensitivity to skewness of text and complex graphic images. When presented information in a well defined coordinate frame, skew angle is consistently and significantly overestimated. Presence of skew is not aesthetically pleasing and has pragmatic effects as well. Presence of skew may result in failure to capture all of the source area of the image because one or more corners may fall outside of the field of view of the scanner due to the skew. Skewed images do not compress as quickly or as compactly as images correctly registered to the page coordinate system. Skewed fields are more difficult to utilize in standard page layout and composition operations such as cropping and inserting.

Skew may arise in several ways including difficulties in paper feeding either at the time of digitization or prior to digitization at the time of photocopying, among others. In an electronic reprographics environment, where reproduction is effected by digital scanning and printing of the resulting bitmaps, early and accurate detection of skew angle can result in a significant reduction in the need for resources to correct for and store the skewed image.

Skew angle determination is traditionally a two stage process. First the feature on which alignment quality will be based is determined, and second, various tests are applied to determine if the proposed alignment is a good one relative to a prior sample alignment or other standard. An "alignment" as used herein is an orientation of the components of an image.

To date, determination of skew angle has been accomplished on image data in uncompressed form. Herein, "image" is taken to mean a pattern or collection of distinguishable regions, whether a likeness, representation or neither, typically but not exclusively that which might be found on a printed page. "Image data" means herein data which is typically, though not exclusively, digital in format which may be used by an appropriate system to reproduce an image. Data in "compressed" format means herein data which has been reduced in extent, e.g., the amount of memory space, in bits, required to store the data, from data in "uncompressed" format, no matter what method is used to compress the data. Determination of skew angle from compressed image data has not been contemplated to date or, if it has, it has been dismissed under the general belief that performing skew detection on compressed image data would require the extra, and potentially unnecessary step of transforming the image into compressed data format.

A technique for the detection of skew angle in uncompressed images is described by Henry S. Baird in *The Skew Angle of Printed Documents*, Proceedings of SPSE Symposium on Hybrid Imaging Systems, pp. 21-24, 1987 (hereafter "Baird"). Initially, Baird must distinguish between a mark or connected component that is text and one that is not text. In this regard, "text" marks or connected components for the purposes of the present disclosure are those comprised of letters, numbers, punctuation and related marks. This is as distinguished from "non-text" marks or connected components which are those not being text, typically graphics, symbols or illustration-type portions of an image. Due to the method used for locating fiducial points, Baird's technique will only yield meaningful results for text images. This classification as text is made by Baird on the basis that the maximum dimension of a text mark is less than or equal to the "em" in a predetermined maximum font size, e.g., 24 point.

The alignment algorithm of Baird's technique operates on the basis of the alignment of selected features associated with each mark, or connected component. "Mark" shall be used herein to refer to a connected component. A "connected component" is defined for the purposes of this disclosure a group of color bearing units, typically picture elements ("pixels") of like color which touch one another. A feature commonly used for this purpose is the "fiducial point." A "fiducial point" as used herein is a point on or associated with a mark which is located by a predetermined set of rules (the same rules for each mark), and which may be used for selected purposes as a representation of a feature of the mark. For example, Baird uses the bottom center of a bounding box around each mark for the fiducial point. Baird's fiducial points 10 are shown as cross-hairs on bounding boxes 12 around marks 14 in FIG. 1a.

In a perfectly aligned horizontal line of English text, for example, each fiducial point will lie on the same horizontal line 16 at the base of the characters (called the "baseline"), with the exceptions of dotted characters, for example the letter "i" of FIG. 1a, certain punctuation marks and characters with descenders, which are portions of the mark which descend below the base line, such as the lower case characters "g", "p", etc. Since a fiducial point is assigned to each connected component, the dotted characters "i"s and "j"s and many punctuation marks (;?!:") give rise to more than one fiducial point per glyph, with at least one of these points significantly misaligned with respect to the baseline. Characters with descenders will generate fiducial points away from, but near to the baseline. Descenders are statistically uncommon enough that the method of Baird (and of the present invention) provides a means for recognizing and compensating for their effect on determination of the true baseline. Note that there is exactly one fiducial point per connected component in the image.

In essence, Baird calculates skew by determining the number of fiducial points per "line" for a variety of rotational alignments. Line as used herein means, for example, one of a plurality of imaginary parallel scan lines traversing the document and oriented perpendicular to a selected feature such as a margin or page edge. The rotational alignments are calculated by trigonometric translation of the fiducial points.

Referring to FIGS. 1b and 1c, counting of the number of fiducial point per line is accomplished by projecting the locations of the fiducial points 10 onto an accumulator line 18 which is perpendicular to the projection direction, as indicated by arrow p. Accumulator line 18 is partitioned into "bins" 20 of a uniform predetermined height, h, for example equal to ⅓ of the height of a six point character. Height h may be varied as appropriate. Height h may be as small as 2 pixels. However, as h decreases, computation time increases. Importantly, as h approaches the character height, skew angle determination performance disintegrates. Returning to the bins, there is exactly one bin per line. The number of fiducial points for a selected line is then equal to the number of fiducial points projected into the bin corresponding to that line.

Since this method results in a relatively small number of fiducial points (depending on the nature of the image), the alignment is made efficient by calculating the alignment on the basis of the sum of a positive power greater than 1, e.g., 2 (sum of squares) of the counts of the fiducial points which appear in each of the rotationally aligned bins. Baird (at page 22, lines 20-22) refers to this sum of squares as "a real-valued *energy alignment measure* function" defined as $$A(\theta) = \sum_{i=1}^{m} C_i^2(\theta)$$

where $C_i(\theta)$ denotes the number of points projected into the $i^{th}$ bin at angle $\theta$, and m denotes the number of bins. The sum of the counts raised to the positive power for each angle, e.g. $A(\theta)$ for the power equal to two, is referred to herein as the "power" for that angle. An index of all such powers will contain a global maximum whose angle $\theta$ is approximately equal to the skew angle. Baird states that the real-valued energy alignment measure function displays a global maximum at the correct skew angle and that experiments suggest that any positive superlinear function of $c_i$ within the summation will perform correctly. FIG. 1b shows the positions of the fiducial points 10 and the relative size of each bin 20 on a skewed text sample in which the bins are unaligned with the skewed text. FIG. 1c shows the distribution of the fiducial points of the same skewed image of FIG. 1b into aligned bins.

Calculation of the power of each of a variety of alignments requires that the positions of each fiducial point be known. Specifically, the coordinates of a fiducial point are used to mathematically translate the fiducial point, by an angle and a displacement from an origin, to a new set of coordinates. This process is done for the complete collection of fiducial points, and the power of the alignments before and after translation are compared. From each comparison, the angle corresponding to the alignment with the greatest power is retained. After all angular alignments within a selected range have been compared in this manner, the skew angle may be assumed to be the angle corresponding to the alignment with the greatest power. In the event of weak alignment or multiple alignments, however, this assumption may need to be otherwise verified.

SUMMARY OF THE INVENTION

The present invention provides a novel method of skew angle determination, overcoming a number of problems and shortcomings of the prior art.

One aspect of the present invention is the discovery of the problem that, in Baird's method of skew angle determination, as skew angle is increased the distance between the bottom of the mark and the bottom of the bounding box may increase. This difference increases as a function of the sine of the angle of skew. This leads to the problem of errors in the count of fiducial points, which affects skew angle determination as a square of that error.

This aspect is further based on the discovery that this problem can be solved by determining skew angle based on fiducial points located on the mark itself. In this manner, the extent of the skew angle does not contribute to error in the determination of that angle.

Related to this aspect of the present invention is the aspect that it has been discovered that line ends form a useful set of features on which to base skew determination. A particularly useful set of features are the line ends located at or near a baseline for horizontally oriented images or a vertical line for vertical or columnar oriented images. Detecting line ends is generic images has proven to be a difficult task. However, a method has been discovered, and forms another aspect of the present invention, to detect a group of features that includes the group of line ends. The set of features is limited in size such that the effectiveness of using line ends is not diminished. By comparing one scan line to a subsequent scan line, pixel color transitions may be located. Proper selection of the pixel color transitions can yield a set of features, including lines ends, which can be used very effectively to determine skew angle.

Another aspect of the present invention is the recognition that another problem of the prior art methods of skew angle determination is that they involve computationally demanding methods of feature (fiducial point) location. According to Baird's method, not only must the mark be identified, a bounding box must be constructed around the mark and the bottom center of the bounding box must be located.

This aspect is further based on the discovery that this problem can be solved by determining fiducial points from a comparison of the scanning of a first line with scanning of a subsequent line. Location of fiducial points will correspond to the location of selected topographic features located on a first scan line without a corresponding topographic feature on the succeeding scan line or, alternatively, without a corresponding topographic feature located on the preceding scan line. In this regard, for the purposes of this disclosure "topographic" feature is taken to mean a feature of a mark, image or portion thereof which is based on its geometrical configuration properties, such as shape, size, curvature, overlaps, etc. This is as distinguished from "non-topographic" features which are features of a mark, image or portion thereof not based on its geometrical configuration, but based on some other attribute such as color, shading, etc.

Yet another aspect of the present invention is the recognition that the prior art methods of skew angle determination produce meaningful results only for text images. This is a result of the method used to determine fiducial point location. A bounding box is constructed around the mark and the bottom center of the bounding box is used as the fiducial point. Baird chose to construct bounding boxes only around text marks. This choice was made based on the presumption that the positions of text marks are aligned and non-text marks may not be. If bounding boxes were then constructed around non-text marks, the fiducial points yielded from the marks would appear as noise, distracting from the significant data needed to determine skew angle. From this comes the aspect of the present invention that skew angle determination may be performed on text or non-text images, or combination of text and non-text. By basing skew determination on fiducial points located on the marks themselves, no bounding boxes need to be constructed. The fiducial points produced from non-text marks, according to this aspect, add significantly to the accuracy of the result. In this way, the text limitation of the prior art is overcome.

A further aspect of the present invention is the realization of the problem in the prior art that no method has utilized image data in a compressed format to determine skew angle. This aspect is related to yet another aspect of the present invention, discovery that performing skew angle determination on a mark, image or portion thereof represented by data in a compressed format would be highly advantageous in many situations and for many purposes. Given that many modern systems process data, if not exclusively, in significant proportion in compressed format, there is at present a need in the art for a skew determination method which utilizes image data in compressed format.

Thus, still another aspect of the present invention is provision of a method for skew angle determination based on image data in compressed format. This respect entails use of features detectable in a compressed data format. That is, virtually all binary image compression schemes use physical characteristics of the image scanned for compression (e.g., pixel color transition). By using the data these features carry with them it is possible to determine skew angle without completely decompressing the image data.

The CCITT Group 4 data compression format (hereafter referred to as "Group 4") is becoming a standard for the transmission of facsimile images, for the intermediate transmission of images between workstations and servers, for the storage format on optical and magnetic media, and for other applications. Software implementations of the compression algorithm are available as are certain special purpose VLSI hardware implementations. For example, Advanced Micro Device's 7971A processor is a dedicated circuit for data compression/-decompression according to the CCITT format. It is therefore another aspect of the present invention to provide a method of skew determination which utilizes image data which has been compressed according to the Group 4 standard.

Related to this aspect of the present invention, it has been discovered that very useful results are achieved by utilizing the locations of so called "pass codes" produced by Group 4 compression as the locations of fiducial points on which to base skew determination. It has been recognized that there are two types of passes—passes of white pixels, and passes of black pixels. Although the CCITT Group 4 compression standard does not differentiate between these two, two further aspects of the present invention are, first, the discovery that by selecting pass codes that indicate passes of white pixels, the accuracy of skew angle determination is greatly improved, and second, the implementation of a method for distinguishing between the two types of pass codes in terms of skew angle determination.

The scope of the present invention and the manner in which it addresses the problems associated with prior art skew determination methods will become more readily apparent from the following detailed description when taken in conjunction with the accompanying drawings and claims.

BRIEF DESCRIPTION OF THE DRAWINGS

FIGS. 3a through 3c shows the three encoding modes of the CCITT Group 4 compression standard;

FIG. 8 shows a portion of skewed text used as an example of one aspect of the present invention;

FIG. 9 shows the locations of the white pass codes for the sample text of FIG. 8 used to determine alignment according to the present invention;

FIG. 10 shows a plot of the power of the alignments for an angle range for the sample skewed text of FIG. 8.

DETAILED DESCRIPTION

A novel method of skew determination employing the aspects listed above, as well as others, will now be described. The method of the present invention is particularly applicable to determination of skew in scanned images. In the present disclosure it is assumed that the image data is broken up into distinct units, preferably lines of the image. This may be accomplished, for example by scanning the image and inserting an indication of the beginning and ending of each scan line or of the run length, as is well known in the art. For convenience these units are hereafter referred to as scan lines.

With increasing prevalence, scanned images are being handled in compressed format. For example, facsimile machines operate on scanned images virtually entirely in compressed format. For this reason, the present invention is described following assuming that the image data is in compressed form (also referred to herein as the compressed data domain). It will be evident to one skilled in the art, however, that the present invention is equally applicable to image data in uncompressed format.

Figure 1A:
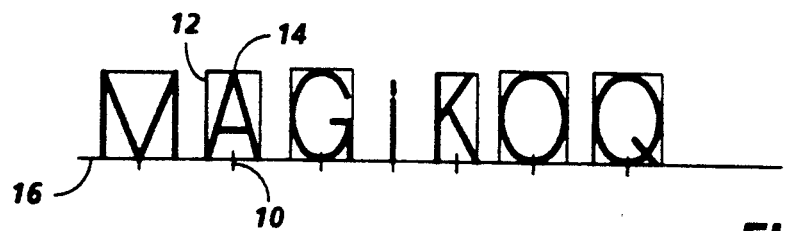
FIG. 1a shows the location of fiducial points on an unskewed image according to one method of the prior art.
Figure 1B:
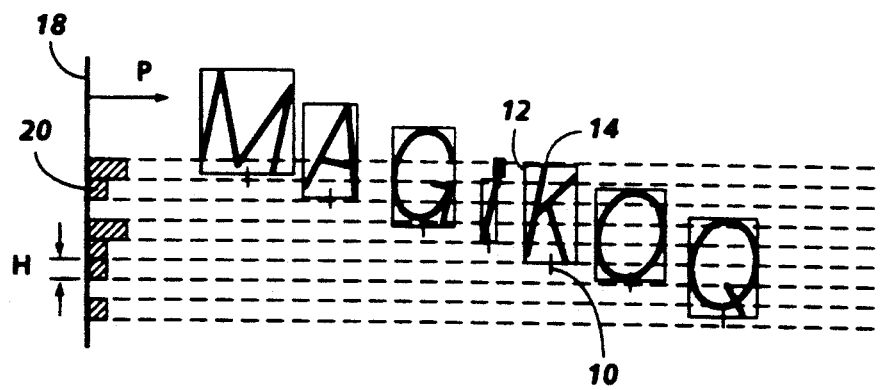
FIG. 1b shows the location of fiducial points on a skewed image according to said method of the prior art together with a plot of the distribution of the fiducial points into unaligned bins.
Figure 1C:
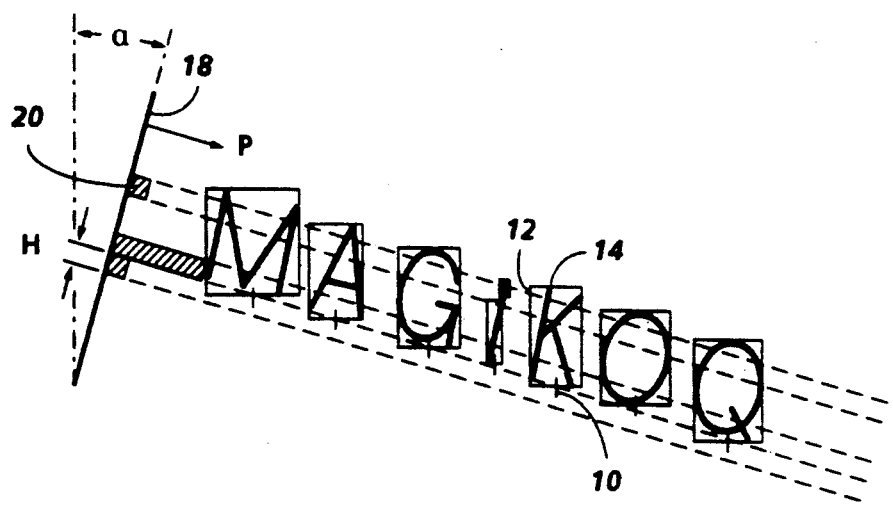
FIG. 1c shows the location of fiducial points on the same skewed image shown in FIG. 1b together with a plot of the distribution of the fiducial points into aligned bins.
Figure 2:
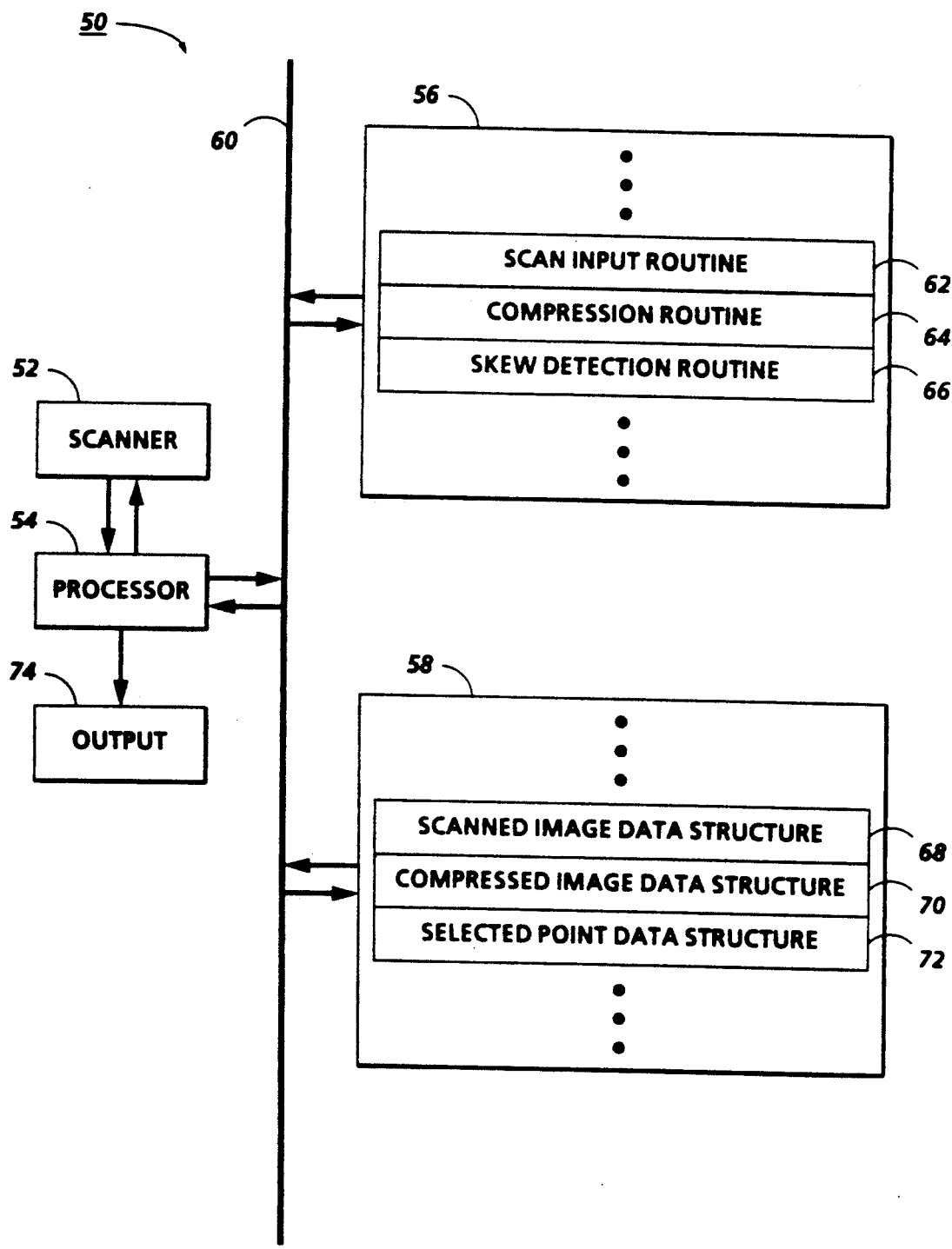
FIG. 2 shows a portion of a computer system which is capable of operating according to the skew angle determination method of the present invention.

FIG. 2 illustrates in block format an environment in which the present invention may operate. Specifically, FIG. 2 illustrates a portion of a computer system 50 tailored to operated according to the various aspects of the present invention. Computer system 50 includes or is connected to receive output signals from a scanner 52, which is capable of scanning an image and producing digital data which represents that image. This digital data is communicated to a processor 54. This processor controls input and output operations and calls to program memory 56 and data memory 58 via bus 60.

Program memory 56 may include, inter alia, a routine 62 for controlling the scanning of an image by scanner 62, a routine 64 for converting the digital data representing the image into a compressed data format, and a routine 66 for determining skew angle from the compressed data. Program memory 56 will thus have associated with it data memory 58 in which may be stored, inter alia, at location 68 the digital data structure produced by scanner 52 under control of the scanning control routine 62, at location 70 the data structure of the compressed representation of the scanned image produced by compression routine 64, and at location 72 the data structure containing selected point data, for example fiducial point location, produced by skew angle determination routine 66. To facilitate the communication between program memory 56 and data memory 58 necessary for operation, each are connected to bus 60 such that input and output operations may be performed. One additional point with regard to memories 56 and 58 is that they have been described as separate for the purposes of clarity and may, in fact, be parts of a single memory block of the computer system without any impact on the present invention.

Under processor control, skew detection routine 66 will access various parts of data memory 58 to acquire data needed to calculate skew angle. Once calculated, skew angle may then be output at 74, which may comprise a means for displaying the results such as a CRT display, hard copy printer or the like, or may comprise a means for utilizing the results to perform further operations, such as modification of the image data to compensate for skewness, etc.

It has been assumed that the image data has been compressed according a the Group 4 standard, although the present invention with proper modification will render similar results using other compression schemes, e.g., CCITT 2-dimensional Group 3 format, etc. The coding scheme of Group 4 relies on the existence and relative spacing between pixel color transitions found on pairs of succeeding scan lines. In Group 4 coding each line in turn becomes a "coding line" and is coded with respect to its predecessor, the "reference line". The first line is coded with respect to an artificially defined all white reference line. See Hunter, et al., "International Digital Fascimile Coding Standards," *Proceedings of the IEEE*, Vol. 68, No. 7, July 1980, pp. 854-867 and Int'l. Telecommunications Union, CCITT (Int'l. Telegraph and Telephone Consultative Committee) Red Book, Geneva 1985 (ISBN 92-61-02291-X) for a more detailed discussion of the Group 4 compression standard.

Encoding in the Group 4 format has 3 modes—vertical, horizontal and pass. These modes are described following with regard to FIGS. 3a, 3b, and 3c. Adjacent scan lines are compared to determine whether, given a first pixel color transition on a reference line such as black to white, there exists a corresponding pixel color transition (i.e., also black to white) on the coding line. The existence and relative spacing of the transition on the coding line from the transition on the reference line is used to determine the mode.

With reference to FIG. 3a, a vertical mode is used when the black to white or white to black transition positions on adjacent scan lines are horizontally close ($\leq 3$ pixels) and thus can be encoded in a small number of bits. Horizontal mode is used when the transition positions are further apart than 3 pixels, as shown in FIG. 3b. Pass mode is used when a transition on the reference line has no counterpart on the coding line, as shown in FIG. 3c. Compressed data then includes, inter alia, a mode code together with a displacement which implies a displacement measured on the reference line as opposed to the coding line.

Figure 4A:
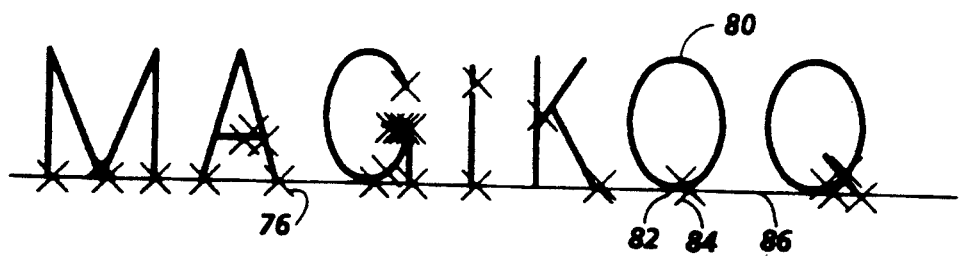
FIGS. 4a and 4b show the location of fiducial points based on pass codes of the CCITT Group 4 compression standard on unskewed and skewed text, respectively.
Figure 4B:
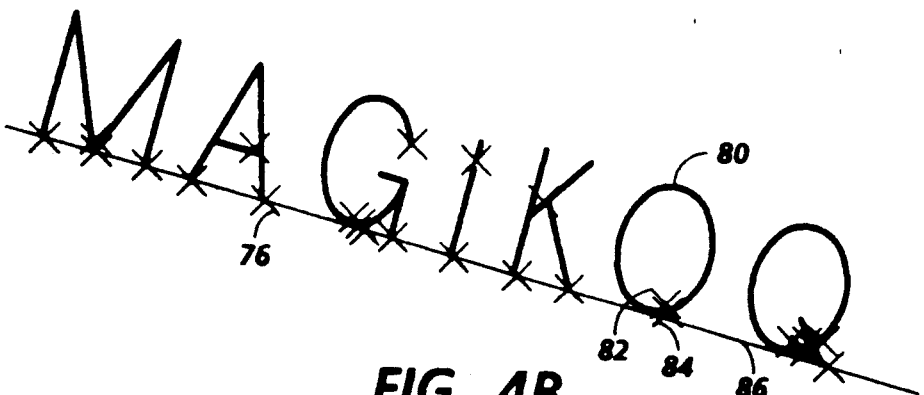

Referring now to FIGS. 4a and 4b, in place of the fiducial points located on the bounding box around a mark used by Baird, the present invention locates fiducial points 76 on the basis of the positions of topographic features of the mark. These topographic features are always located on the marks themselves. Specifically, skew is determined from the locations of the pass codes in the Group 4 compressed representation of the image. The positions of the pass code fiducial points 76 on unskewed and skewed text are shown as "x" marks in FIGS. 4a and 4b, respectively.

Since all pass codes are defined relative to a point on a mark, all fiducial points are located at some point on a mark, regardless of the extent of the skew. Further, because there may be more than one pass code in the compressed data representing a mark, there may be more than one fiducial point per mark. For example, for typical font styles, passes will be generated in two places along the baseline of many characters including upper and lower case "A", "H", "K", etc., and in three places along the baseline of an upper and lower case "M".

Passes may also be generated as a result of aliasing errors, for example as shown on the underside of the crossbar of the unskewed "G" and on the right leg of the unskewed "K" in FIG. 4. Distinguishing such aliasing errors is beyond the scope of the present invention. However, aliasing errors in certain circumstances lead to useful and meaningful results. For example, when long horizontal structures are digitized aliasing errors frequently occur. Since the presence of these aliasing errors result in the generation of pass codes representing transistions from black to white, long horizontal lines provide a large number of such pass codes, with no ambiguity in the alignment which they represent. Thus, horizontally aligned graphical structures materially improve the determination of skew angle because of their tendency to generate aliasing errors. It should be added that large non-horizontal structures do not significantly degrade the performance of the present invention since they are not, in general, subject to aliasing errors which generate pass codes because the aliasing errors are encoded using the Group 4 vertical mode.

There are two types of passes—white passes, from a pass of white pixels, and black passes, from a pass of black pixels. Since white passes are indicative of the bottoms of black structures, they are somewhat analogous to finding the bottoms of connected components in the raw bitmap, such as line ends. In fact, there is guaranteed to be at least one white pass at the bottom of each connected component. Thus, it is advantageous to use white passes as the fiducial points, although it will be apparent to one skilled in the art that black passes may also be used to determine skew angle according to the present invention in appropriate circumstances. The positions of the white pass code fiducial points 78 on unskewed and skewed text are shown as arrows in FIGS. 5a and 5b, respectively.

The Group 4 encoding of passes does not distinguish between white passes and black passes. To known which color of pass has been encoded, state must be maintained. According to the present invention, state is maintained by a binary state bit which is set to correspond to the fictitous all white first line. Each event yielding a pass code causes the state bit to invert which thereby keeps running track of the state (i.e., color) of the pass code.

Figure 5A:
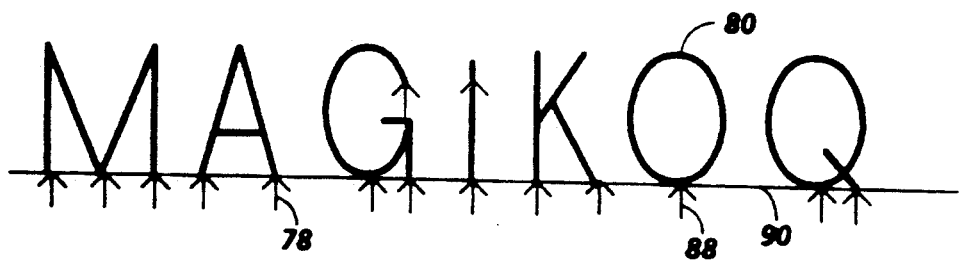
FIGS. 5a and 5b show the location of fiducial points based on white pass codes from the pass codes of the CCITT Group 4 compression standard on unskewed and skewed text, repectively.
Figure 5B:

Comparing FIGS. 4a, b and 5a, b, it will be noted that fewer fiducial points are generated off the baseline of the text in FIG. 5 that in FIG. 4. For example, note that the "O" 80 in FIGS. 4a and 4b has associated with it 2 fiducial points, upper point 82 and lower point 84. Lower point 84 is on the baseline 86, while upper point 82 is not. That same "O" 80 in FIGS. 5a and 5b has associated with it only a single fiducial point 88 located on baseline 90. This is a graphical indication that white passes will be advantageous in providing fiducial points on which to base skew measurements by alignment. However, some "noise" is generated by using white passes. That is, some fiducial points are generated which are not directly on the baseline which are added to the baseline information. For example, "C" will generate two white passes, one at the bottom of the mark and one at the bottom of the stroke which forms the upper limit on the opening on the right of the "C". Similarly, the bottom of the center of the "M" which gives rise to a pass code might not lie on the baseline in some fonts. Distinguishing such noise signals is beyond the scope of the present invention. However, the occurrence of noise signals is statistically infrequent enough that they do not significantly degrade accuracy of the determined skew angle nor significantly add to the calculation time.

Figure 6:
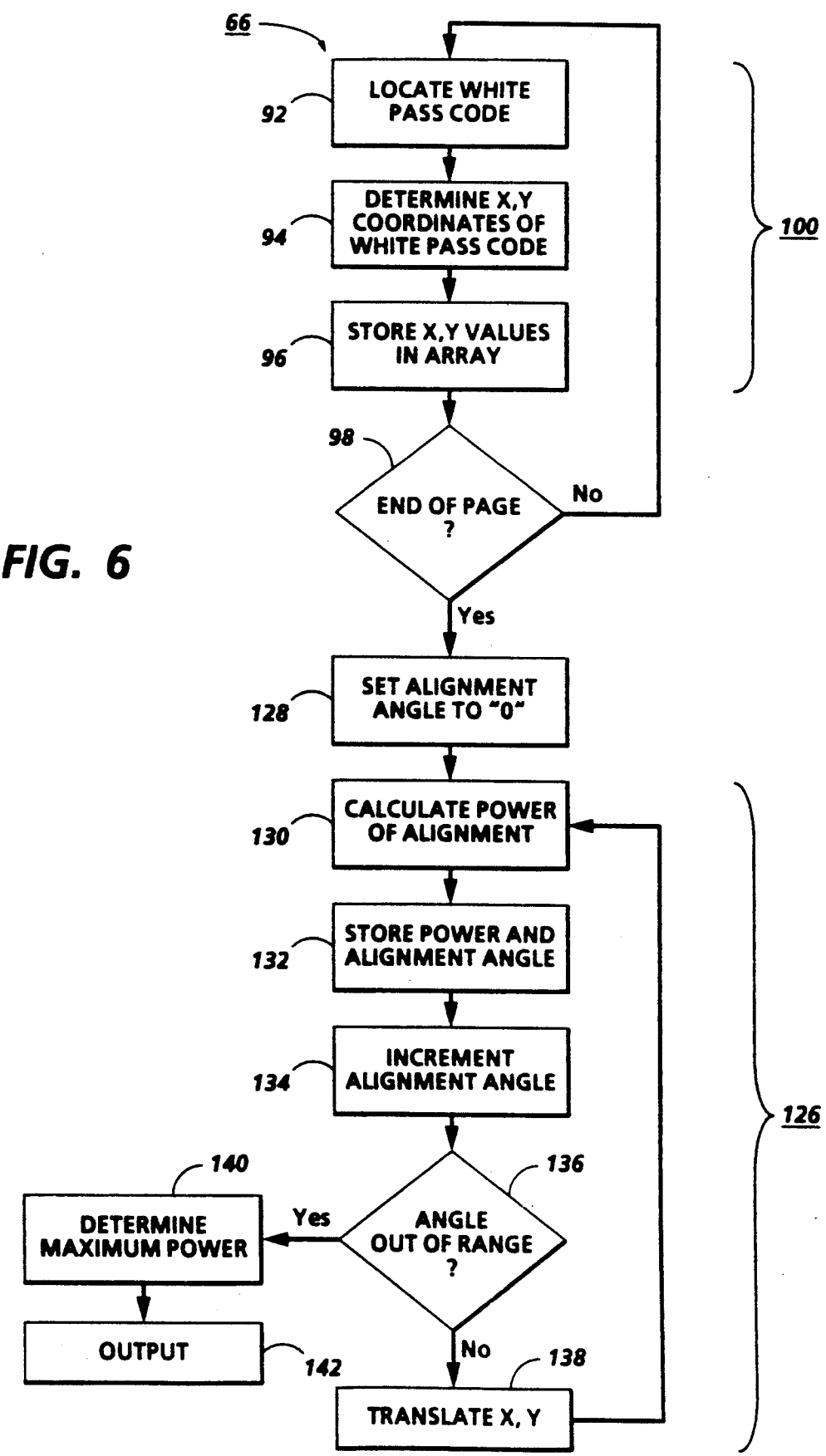
FIG. 6 shows a flow diagram of one aspect of the present invention.

FIG. 6 shows a block diagram of an implementation of skew detection routine 66 such as might be located in program memory 56 of FIG. 2. It is assumed, for the starting point of routine 66 that an image has been scanned, that digital data has been produced corresponding to the scanned image, and that that digital data has undergone compression according to a selected data compression method such as that producing Group 4 compressed data.

To begin, the white pass codes in the data structure of compressed image data, for example that stored at location 72 of data memory 58, are located. This is indicated by box 92 of FIG. 6. Once a white pass code is located, its location in an appropriate coordinate system must be determined, as done by box 94. Rectangular coordinates having an abscissa, x, and an ordinate, y, coordinate pairs are generally convenient for this purpose, although within the scope of the present invention are contemplated other coordinate systems such as polar coordinates, when appropriate. An array of the coordinate pairs may then be constructed at 96 for use in computing alignments, as discussed in detail below. After storing the coordinate pairs of the locations of the white pass codes, a test is performed at 98 to determine whether the end of the scanned page has been reached. If so, skew angle determination proceeds as discussed in detail below. If not, a search is done for the next, if any, white pass code on the page.

Figure 7:
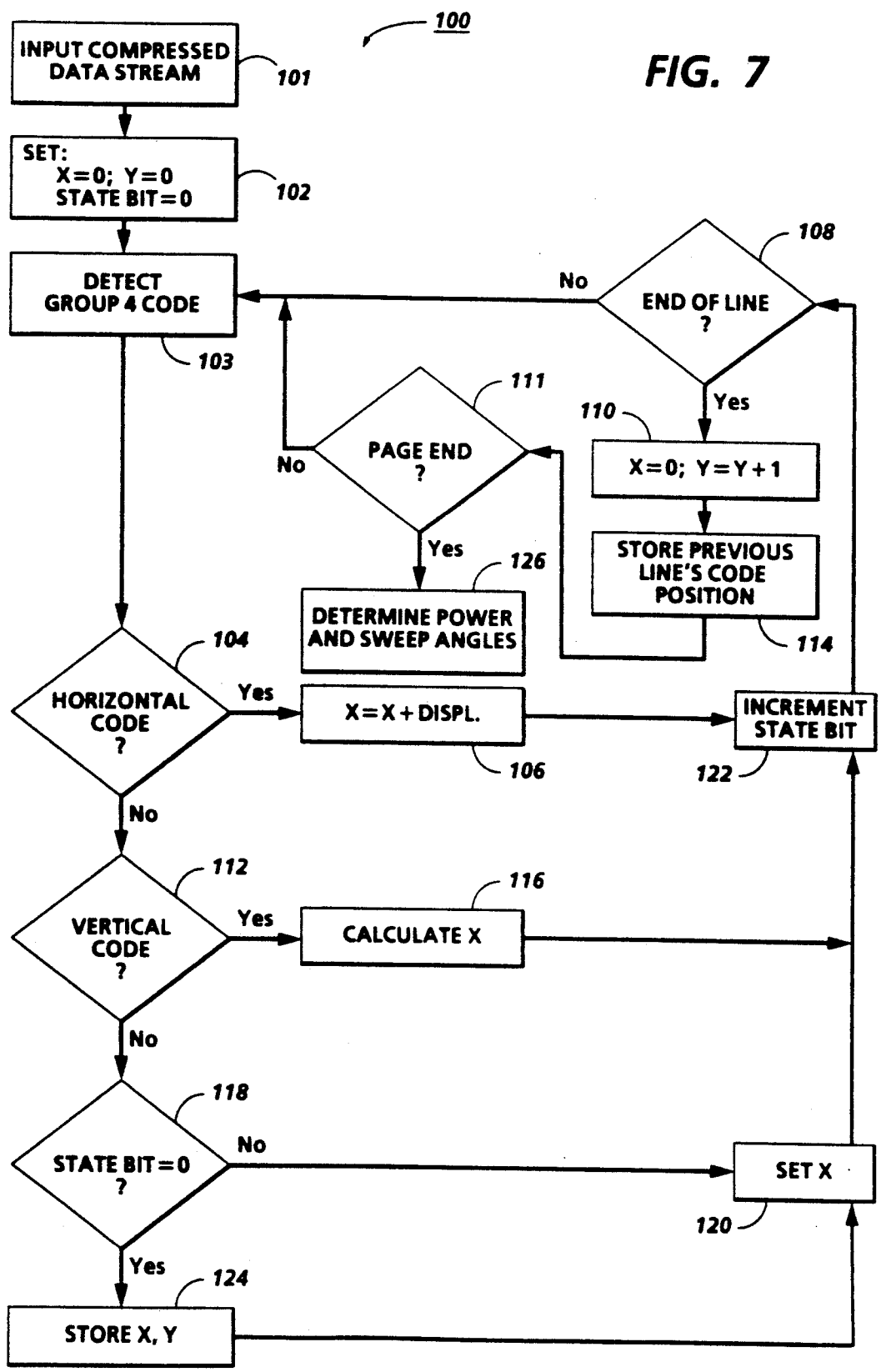
FIG. 7 shows a flow diagram of another aspect of the present invention.

The previous four steps 92 through 98 are collectively referred to as coordinate determination routine 100, which may be a subroutine of skew determination routine 66, and which is further described now with reference to FIG. 7. Block 101 illustrates an input of data in the Group 4 compressed format. Using x-y coordinate pairs, x and y must first be initialized to 0 to indicate the start of a page. This is shown by step 102, and is done at the start of each new scanned page.

Block 103 represents detection of a Group 4 code. As mentioned, there are three types of Group 4 codes—horizontal, vertical, and pass. See CCITT Red Book, cited above. Detecting Group 4 codes may be implemented by character string recognition, or other method from the wide variety within the ambit of one skilled in the art for code detection. Once a Group 4 code is detected, its type must be determined. That is, which of the three Group 4 types is it, and if it is a pass code, is it a white pass code or a black pass code. This process is done through a series of tests, the results of which determine how the x coordinate is determined. The x coordinate is referred to in terms of an old value of x, that is one that is associated with the code located by step 103 in the immediately preceding pass through coordinate determination routine 100, and a new value of x, that is one that is associated with the code located by step 103 in the current pass through coordinate determination routine 100.

A code having been located, a test is performed to determine whether that code is a horizontal code. If so, the new value of x will be the old value of x added to the displacement value associated with the horizontal code. That is, the horizontal mode of Group 4 includes a code indicating the mode and a displacement indicating the number of pixels between the reference pixel color transition and the current pixel color transition. In the case of a horizontal code, the displacement is the number of pixels between a pixel color transition on the particular line and the next pixel color transition on that same line. This is indicated at 106.

It is important to note that this new value of x will not become an abscissa value used to determine alignment. Rather, this value is the running value of the displacement from the first pixel position on a scan line. Only the x values relating to white pass codes are used for alignment determination.

Proceeding for the moment with the assumption that a horizontal code is detected, a binary pixel color state bit is then incremented at 122, the method of and purpose for doing so are described in detail below. Once the new value of x has been calculated, x is checked at 108 to determine if the line end has been reached. This may be conveniently done by comparing x to the known length of a scan line, in pixels, and should x reach this value the line end has been detected. If the line end has not been reached, code detection continues for that line at 103. If the line end has been reached, x is set to 0 at 110 to correspond to the beginning of the next line and y, which keeps a running count of the line number, is incremented by one and checked at 111 to determine if the page end has been reached. This may be done, as with x, by comparing y to the known number of lines per page, and if y reaches this number a page end has been detected. If a page end has been reached, power is determined for various alignments swept through a number of alignment angles, at 126, as discussed in detail below. If page end has not been reached, code detection then resumes at 103.

If the code is determined not to be horizontal, it must be tested to determine if it is a vertical code, which is done at 112. It is necessary to store each transition position from the previous line for use as values on the reference line in the vertical mode. This is done in an array of the type $\{x1_r, \ldots xn_r\}$, where r indicates a value on the reference line (the preceding scan line) and n is the total number of codes on the reference line. It is only necessary to preserve x values for the previous line, therefore, the new x values may overwrite the old once determined. This is shown at 114.

Assuming now that a vertical code has been detected, the value for x is then calculated at 116 as follows. The vertical mode is coded from a displacement between a pixel transition at pixel $b_i$ on the reference line and a pixel transition at pixel $a_i$ on the coding line. Since for the calculation of this displacement we are concerned only with x values, this displacement can be calculated simply as $|x_{bi}-x_{ai}|$, where $x_{bi}$ and $x_{ai}$ are the x values for pixels $b_i$ and $a_i$, respectively. The new x value is the old x value added to this displacement. Again, the binary pixel color state bit is incremented at 122, and the new x value is tested at 108 to determine if the end of line has been reached, and at 111 to determine if end of page has been reached, and so on.

If the code detected fails the tests at both 104 and 112, the code is, by process of elimination, a pass code. As already mentioned, it is important to distinguish between white and black pass codes. White pass codes will be used to determine alignment, while black pass codes will not. Although Group 4 does not distinguish between white and black pass codes, by keeping track of a binary pixel color state bit at 118 state may be determined. Initially, the state bit has been set to 0 at 102. Arbitrarily, 0 has been chosen to correspond to white pass codes. Each time a code is detected, the state bit is checked. If the state bit is not equal to 0, i.e., the pass code is not a white pass code, the new value of x is set to equal the old value of x at 120. Assuming the next code encountered is not a pass code, that next code will have associated with it the requisite information needed to properly calculate the next x. If the next code encountered is a pass code, the process is repeated until a code is encountered which is not a pass code. This is the essence of a Group 4 pass code. Continuing, the new value of x has been set at 120, and the state bit is incremented at 122 for the next encountered pass code.

If the state bit is determined to equal 0, a white pass code has been encountered. The location of this white pass must be maintained for purposes of calculating power of the alignment and for the transformation steps discussed below to sweep across several alignment angles. This may be done at selected point data location 72 of data memory 58 of FIG. 2. The maintaining of the locations of the white pass codes is performed at 124. Next, x is set, the state bit incremented and line and page ends checked for, as discussed above.

Returning now to FIG. 6, this description continues assuming line and page ends have been reached. If this is the case, power is to be determined for a plurality of alignments having different alignment angles, as generally indicated by reference numeral 126. Initially, alignment angle is set to 0 at 128. This alignment corresponds to the alignment that the image was scanned at. For this alignment angle, the power of the alignment is calculated, generally as described above. In this case, a call may be made to memory location 72 of data memory 58 and the number of x values stored therein determined for each line. This represents the bin size for each line. The square of the number of x values for each line will be accumulated in an array at 130 representing the power of the alignment at the present alignment angle. The array of squares will be stored, together with the present alignment angle, at 132, which may be a part of data memory 58.

Next, the alignment angle is incremented by a selected amount, for example 1 degree, at 134. The power of the alignments will be determined for alignments within a range of alignment angles. Selection of the range of alignment angles will depend on a number of factors such as expected range of alignment angles, expected strength of alignments, expected number of alignments, etc. The greater the range of alignment angles, the greater the computation time for a given angle increment. In any event, an example of a range of skew angles might be $-40$ to $+40$ degrees. Thus, once incremented, the current alignment angle must be tested to determine whether it falls outside the selected range. This is done at 136. If the current alignment angle does not fall outside the selected range, the locations of the white pass codes will be translated at 138. Several methods of translating the locations of the pass codes exist, and their applicability depends on the coordinate system used, the memory size available, the speed of calculation required, etc. As an example, an effective set of equations for use with Cartesian coordinates, with y increasing in the downward direction, which are in keeping with the above description are $$x_j = x \cos \alpha - y \sin \alpha$$

$$y_j = x \sin \alpha + y \cos \alpha$$

If the current alignment angle does fall outside the selected range, maximum power may then be determined at 140 by comparing the powers of the various alignments previously stored. This maximum power may then be output at 142 in a wide variety of formats, for example an absolute angle, a spectrum of angles together with their powers, etc. The format of the output will depend on the intended use of the results, as previously described. A specific example follows to further illustrate the present invention.

EXAMPLE

Shown in FIG. 8 is sample text used to test the method of the present invention. The bin size has been set to two pixels as a reflection of the minimum detectable skew in a digital image (that is, one pixel difference in vertical position across the width of the image). For the same reason, angular increment size has been limited such that no attempt would be made to resolve skew angles below this threshold. Alignment is measured over a $+/-80$ degree sweep.

White pass code locations for the sample skewed text of FIG. 8 are shown in FIG. 9. These white pass codes are used to calculate the various rotational alignments. FIG. 10 shows the power as a function of alignment relationship for these white pass fiducial points of FIG. 8. Skew angle may be determined graphically from the plot of FIG. 10 as the angle that the relative maximum power peak differs from the horizontal 0-degree indication.

Note the three dashed arcs in FIG. 10. The innermost arc shows the power level to be expected if the fiducial points were unaligned. The next arc is drawn at the average power level over the 80 degree sweep. The outer-most arc is drawn at the peak power level. These arcs demonstrate the statistical significance of the peak power level as determined by the power calculation algorithm.

If a Baird-like alignment process is applied to the fiducial points which correspond to the positions of white passes in the Group 4 compressed representation of the image an efficient and accurate means of determining the skew angle in the underlying image results.

TESTING

Testing of the present system on CCITT test data demonstrates that the present invention provides a significant improvement in skew angle detection performance in a majority of cases. A comparison of skew angle detection performance between the method of Baird and the present method is shown in table 1 for the CCITT Test Documents, Document 1 through Document 8, illustrated in the aforementioned Hunter et al. reference. In each instance both skew angle detection algorithms were applied to the raw bitmaps to determine the amount of skew detected by the algorithm in the supposedly unskewed image. Then the bitmaps were digitally rotated through −3.0 degrees and +5.0 degrees, and the skew angle determination was performed again.

TABLE 1

| File | No Rotation | | −3.0 Degree Rotation | | +5.0 Degree Rotation | |
|---|---|---|---|---|---|---|
| | Baird (degrees rotation) | Present Invention (degrees rotation) | Baird (degrees rotation) | Present Invention (degrees rotation) | Baird (degrees rotation) | Present Invention (degrees rotation) |
| Document 1 | 0.20 | 0.24 | −2.76 | −2.80 | 5.20 | 5.24 |
| Document 2 | −1.00 | 0.10 | −4.00 | −2.12 | 6.00 | 5.02 |
| Document 3 | −0.32 | −0.32 | −3.16 | −3.24 | 4.88 | 4.76 |
| Document 4 | −0.04 | −0.08 | −3.00 | −3.00 | 4.92 | 5.00 |
| Document 5 | 0.52 | 0.48 | −2.48 | −2.52 | 5.52 | 5.48 |
| Document 6 | 0.08 | 0.24 | −2.88 | −2.88 | 5.08 | 5.12 |
| Document 7 | 0.16 | 0.16 | −2.84 | −2.88 | 5.08 | 5.12 |
| Document 8 | 0.08 | −0.20 | −3.20 | −2.96 | 4.92 | 5.12 |

One notable result of the above tests is that the step of classifying marks as being either text or non-text has been obviated. In fact, the present invention yields highly relevant and accurate results for images, which are predominantly non-texual (such as document 2). This result is especially important at high skew angles, arrising from the fiducial points being explicitly tied to the structure whose skew angle is being determined.

Presence of halftones with non-orthogonal screen angles may not degrade performance of the algorithm of the present invention since the halftone areas should be encoded using the uncompressed mode of the Group 4 recommendation and not involve the use of pass codes. Nevertheless the effect of the presence of halftone material on this technique has not yet been tested.

Figure 11:
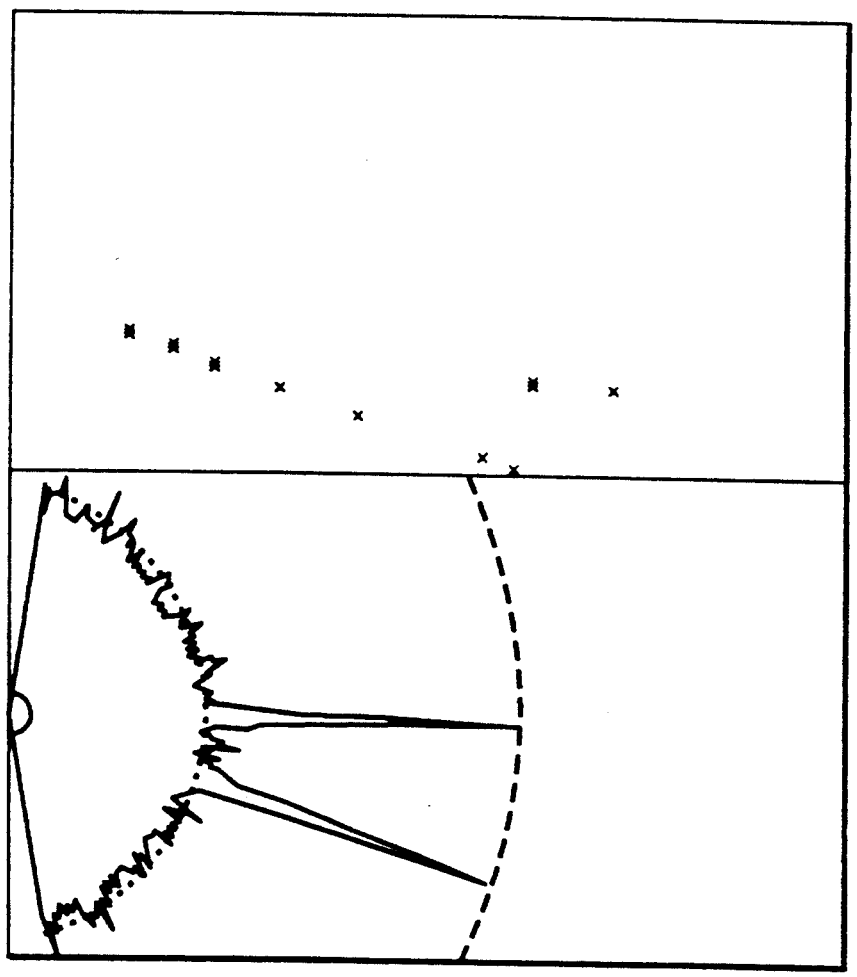
FIG. 11 shows a plot of power of alignments for text having multiple skew angles.

Characterizations of the shape of the power distribution can lead to useful generalizations about the predominance of a single skew angle in the page image. With reference to FIG. 11, the presence of multiple well defined peaks is an indication of multiple well represented alignments in the source image. The method of determining such multiple alignments does not differ materially from the method of determining skew of an image having only a single alignment.

The present invention is designed to generalize about the predominant skew angle over an entire page image. However, multiple skew angles can arise in advertising copy and as an artifact of improper paste-up. In such cases, this technique will still generalize about the entire image and this generalization may or may not be valuable in the characterization of the image. Where the relative skew angles are large as they might be in advertising copy, the assignment of a single skew angle characteristic to the page image will be meaningless, but in the case of paste-up errors, a single skew angle determination may be adequate to represent the image as well as being the only simply available measure.

The present invention thus discloses methods for locating, selecting, and utilizing features, particularly topographic features, of an image for the purpose of determining skew angle. The present invention is significantly computationally less intensive than those methods detailed in the prior art. The present invention also takes advantage of the wide availability of inexpensive data compression packages and the simplicity of integrating those packages into a single system.

In general, to those skilled in the art to which this invention relates, many changes in construction and widely differing embodiments and applications of the present invention will suggest themselves without departing from its spirit and scope. Thus, the disclosures and descriptions herein are illustrative, and are not intended to be in any sense limiting.

What is claimed is:

1. A computer-implemented image analysis method of operating on image data defining an image that includes marks to obtain data indicating a skew angle of marks in the image, the method of the type wherein skew angle is determined as the angle corresponding to a selected one of a group of alignments, each alignment having associated with it a power upon which the selection is based, the power of each alignment being calculated from a count per line of selected features for that alignment, the image data being of the type which includes an indication of points of pixel color transition; the method comprising acts of:
choosing as said selected features the locations of selected ones of said points of pixel color transition;
selecting an alignment;
determining said locations of selected ones of said points of pixel color transition for said alignment; and
calculating the power of said alignment from said locations of selected ones of said points of pixel color transition such that the selected one of a group of alignments is selected based on the calculated power.

2. A computer-implemented image analysis method of operating on image data defining an image that includes marks to obtain data indicating a skew angle of marks in the image, the method of the type wherein skew angle is determined as the angle corresponding to a selected one of a group of alignments, each alignment having associated with it a power upon which the selection is based, the power of each alignment being calculated from a count per line of selected features for that alignment, the image data being of the type which includes an indication of points of pixel color transition; the method comprising acts of:

choosing as said selected features the locations of selected ones of said points of pixel color transition;

selecting a first alignment;

determining said locations of selected ones of said points of pixel color transition for said first alignment;

calculating the power of said first alignment from said locations of selected ones of said points of pixel color transition;

selecting a second alignment;

determining said locations of selected ones of said points of pixel color transition for said second alignment;

calculating the power of said second alignment from said locations of selected ones of said points of pixel color transition; and determining the skew angle from a comparison of the powers of said first and second alignments, the skew angle being that angle corresponding to an alignment having a maximum power.

3. The computer-implemented image analysis method of claim 2 wherein the image data is in a compressed format which includes pass codes, and further including acts of:

determining the locations of the pass codes; and utilizing the locations of the pass codes as the locations of said selected points of pixel color transition.

4. The computer-implemented image analysis method of claim 3 further including acts of:

determining pass codes that indicate a pass of white pixels;

determining the locations of the pass codes that indicate a pass of white pixels; and utilizing the locations of the pass codes that indicate a pass of white pixels as the locations of said selected points of pixel color transition.

5. In a computer-implemented image analysis method of operating on image data defining a scanned image that includes marks to obtain data indicating at least one skew angle of marks in the scanned image, the method of the type wherein the skew angle is determined by forming a count of selected topographic features of the image, forming selected weighted sums of said topographic features such that said weighted sums of topographic features form a plurality of alignments and determining as said skew angle that alignment which maximizes one or more of said weighted sums, the method further comprising:

scanning the image in a sequential linear pattern of contiguous scan lines to form pixel image data; and selecting as said topographic features the locations of pixel color transition from a first color to a second color in said image data for a selected one of said scan lines which do not have a corresponding pixel color transition from said first color to said second color in said image data for an adjacent one of said scan lines before a color transition from said second color to said first color on said selected one of said scan lines.

6. The computer-implemented image analysis method of claim 5 wherein said first color is black and said second color is white.

7. A method of operating a processor to perform image analysis; the method comprising acts of:

obtaining image data defining an image that includes marks at a skew angle;

using the image data to obtain location data, the location data indicating a plurality of locations at which color transitions occur in the image;

using the location data to obtain respective power data for each of a plurality of alignments at which lines traversing the image can be aligned; the respective power data of each alignment indicating a sum of terms, each term being a positive superlinear function of the number of locations at which color transitions occur in the image along a line at the alignment; and using the respective power data of the plurality of alignments to obtain skew data indicating the alignment whose respective power data indicates a maximum power; the alignment that is indicated by the skew data being approximately the same as the skew angle.

8. The method of claim 7 in which the marks are text marks.

9. The method of claim 7 in which the marks are non-text marks.

10. The method of claim 7 in which the processor is connected for receiving data defining images from a scanner; the act of obtaining image data comprising receiving the image data defining the image from the scanner.

11. The method of claim 7 in which the image data is in a compressed data format.

12. The method of claim 11 in which the compressed data format is a CCITT compression format that includes pass codes, each pass code indicating a position of a color transition; the act of using the image data to obtain location data comprising obtaining coordinates of a pass code, the location data including the coordinates of the pass code.

13. The method of claim 12 in which the pass code is a white pass code.

14. The method of claim 7 in which the location data indicate locations of color transitions from black to white.

15. The method of claim 7 in which the act of using the location data to obtain respective power data comprises:

for each of a plurality of lines traversing the image at an alignment, obtaining count data indicating a number of locations on the line that are indicated by the location data;

for each of the plurality of lines, obtaining sum term data indicating a number that is a positive power of the number indicated by the count data; the positive power being a power greater than one; and obtaining a sum of the numbers indicated by the sum term data for all of the plurality of lines to obtain the respective power data of the alignment.

16. The method of claim 15 in which the positive power is two, the respective power data of the alignment being a sum of squares.

17. A machine comprising:

memory for storing data; and a processor connected for accessing the data stored in the memory;

the data stored in the memory comprising:

image instruction data indicating image instructions the processor can execute to obtain image data defining an image that includes marks at a skew angle; and skew instruction data indicating skew instructions the processor can execute to obtain skew data indicating an alignment approximating the skew angle; the processor, in executing the skew instructions:

using the image data to obtain location data, the location data indicating a plurality of locations at which color transitions occur in the image;

using the location data to obtain respective power data for each of a plurality of alignments at which lines traversing the image can be aligned; the respective power data of each alignment indicating a sum of terms, each term being a positive superlinear function of the number of locations at which color transitions occur in the image along lines at the alignment; and using the respective power data of the plurality of alignments to obtain skew data indicating the alignment whose respective power data indicates a maximum power; the alignment that is indicated by the skew data being approximately the same as the skew angle.

18. The machine of claim 17, further comprising a scanner; the image instructions comprising scan input routine instructions that the processor can execute to control operation of the scanner to obtain the image data.

19. The machine of claim 17 in which the image instructions comprise compression routine instructions that the processor can execute to convert the image data into a compressed data format; the processor, in executing the skew instructions, using the image data in compressed data format to obtain the location data.

* * * * *